US010990636B1

(12) United States Patent
Beaudreau

(10) Patent No.: US 10,990,636 B1
(45) Date of Patent: Apr. 27, 2021

(54) PROCESSING TRAVEL PROPERTY SEARCHES USING AMENITY-USE DATA

(71) Applicant: HomeAway.com, Inc., Austin, TX (US)

(72) Inventor: Scott Jared Beaudreau, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 565 days.

(21) Appl. No.: 15/900,293

(22) Filed: Feb. 20, 2018

(51) Int. Cl.
*G06F 16/9535* (2019.01)
*G06Q 50/14* (2012.01)
*G06F 16/2457* (2019.01)
*G06F 16/9537* (2019.01)

(52) U.S. Cl.
CPC .... *G06F 16/9535* (2019.01); *G06F 16/24578* (2019.01); *G06Q 50/14* (2013.01); *G06F 16/9537* (2019.01)

(58) Field of Classification Search
CPC .......... G06F 16/9535; G06F 16/24578; G06F 16/9537; G06Q 50/14
See application file for complete search history.

(56) References Cited

U.S. PATENT DOCUMENTS

| 2012/0221595 | A1* | 8/2012 | Slowe | G06Q 30/0282 707/769 |
| 2014/0236645 | A1* | 8/2014 | Aaron | G06Q 10/06 705/5 |
| 2018/0110093 | A1* | 4/2018 | Deros | H01R 31/065 |

OTHER PUBLICATIONS

Ciobanica, Designing an Information Gathering Application for a Personalized Travel Recommender System, pp. 102-106 (Year: 2012).*

* cited by examiner

*Primary Examiner* — Albert M Phillips, III
(74) *Attorney, Agent, or Firm* — Knobbe, Martens, Olson & Bear, LLP

(57) ABSTRACT

A network-based service is disclosed for identifying travel properties of interest to a user based on historical data reflecting amenity use at the travel properties. The service may, for example, list a number of travel properties available for occupation by a user. The service may be in communication with amenity-associated devices of one or more travel properties, such as home automation devices. Provided that all occupants consent, the service may utilize data from amenity-associated devices to anonymously track usage of amenities at the properties. When a user searches for properties, historical data regarding past amenity use can be used to enrich search results. For example, where the user desires a property with a given amenity, results can be sorted based on actual usage of the amenity across properties. This can enable the user to determine the real-world benefits of the amenity with greater accuracy.

21 Claims, 5 Drawing Sheets

PROCESSING TRAVEL PROPERTY SEARCHES USING AMENITY-USE DATA

BACKGROUND

Computing devices and computing networks are frequently employed by users to obtain information on a variety of topics. For example, computer networks can enable a user to search for and acquire travel items, such as access to a property (e.g., a hotel, bed and breakfast, vacation home, or the like). A system may provide a user with information regarding potentially acquirable properties, such as various amenities offered by the property. This information is often submitted to the system by a property owner, and shown to all users requesting information regarding the property.

Because the number of properties available for acquisition is often quite large, users can have difficulty in locating a property best suited to their individual preferences. To address this excess of information, some systems apply categorizes to properties in an effort to characterize them generally. For example, systems may categorize properties according to a "star" rating, signifying attributes such as a perceived luxuriousness of the property. These categorizations are also generally not user specific. Thus, users in practice will often review many properties in an effort to determine which is most suited to their needs. This excessive review leads to waste both in terms of a user's time and in computing resources used to conduct various searches and search large amounts of information to the user for review.

In some instances, a system's information regarding properties may be inaccurate or outdated. This can occur, for example, where a property owner submits incorrect information to a system or fails to update the information as it changes. Such an occurrence can be particularly likely where the owner is non-intuitional or non-professional, such as when an individual list's their property for temporary use. In other instances, a system's information regarding a property may be accurate, but not reflect valuable details regarding the property. For example, the system's information may indicate that a property has a specific amenity (e.g., a fireplace or hot tub), but not reflect details regarding that amenity that might materially affect a user's use of the amenity (e.g., the quality of the amenity, a difficulty of use of the amenity, etc.). This inaccuracy in system information can lead to the system conveying misleading information and user dissatisfaction.

DETAILED DESCRIPTION

Figure 1:
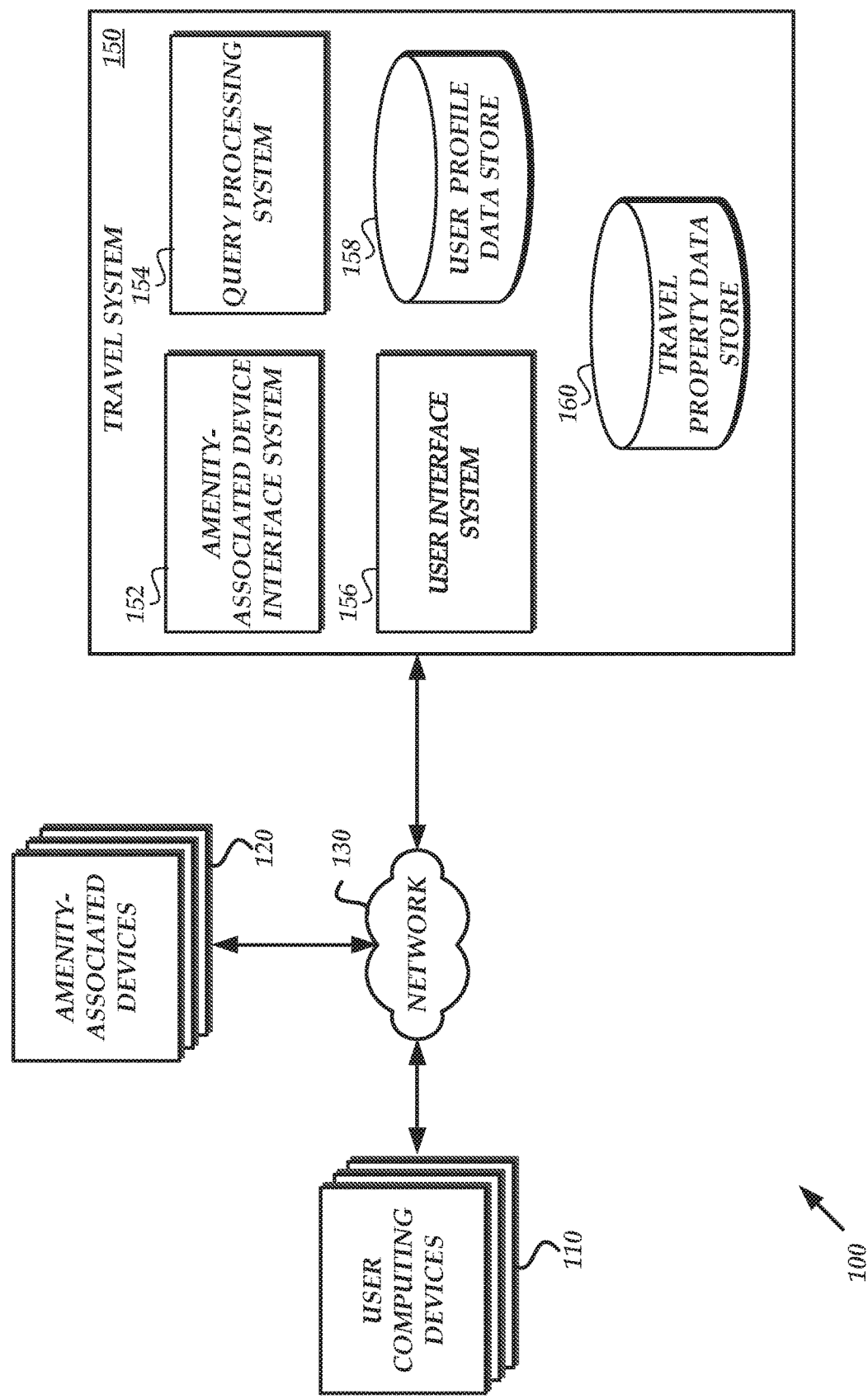
FIG. 1 is a schematic block diagram of an illustrative network environment in which a travel service may operate to enable user submission of queries for travel property information and to select travel property information for display based at least partly on amenity-use information for a travel property, a user, or a combination thereof.

Generally described, aspects of the present disclosure are directed to processing user-submitted queries to a travel system, and providing in response to such queries information regarding properties that are available for occupation by a user, such as hotels, homes, or the like. More specifically, aspects of the present disclosure relate to the generation of amenity-use data reflecting use of one or more amenities provided by a property by one or more users, and the selection of property information to be included in a response to a user-submitted query based on amenity-use data related to a property, to a user, or a combination thereof. In one embodiment, a travel property may include a variety of amenity-associated devices, such as network-enabled fixtures, appliances, or the like (which are in some instances referred to as "Internet of Things" or "IoT" devices), which are in communication with the travel system. Provided that the travel system obtains the authorization and consent of both an owner of the property and occupants, the travel system may utilize information (e.g., anonymized information) regarding the amenity-associated devices to gather information regarding amenity use at the property, such as whether an occupant utilized a home theater system during their stay at the property. The travel system may then utilize this information to enhance information returned to users in response to a query for properties. For example, given a query for a property with a home theater system, the travel system may preferentially select a property with a frequently used home theater system over a property with a less frequently used home theater system. Where an occupant of a property is also a user of the travel system, the system may in some instances (e.g., given consent of the user) utilize past amenity-use information to enhance or supplement searches of the user on the system. For example, where a user queries for properties in a given geographic area, the system may select properties within that geographic area that have amenities matching those commonly used in the past by the user. Thus, the travel system can be enabled to provide users with information regarding properties whose amenities match their own preferences, without requiring the users to explicit request such amenities within a query.

Amenity-use data may be generated by or based on operation of a number of devices. In some instances, these devices may be associated with a specific property. For example, a property may include "smart home" devices or other network-enabled devices that can monitor or sense user activity within the property. Examples of such devices include, but are not limited to, network-connected thermostats, light bulbs, light switches, entertainment devices (e.g., televisions, streaming content devices, game consoles, etc.), heating or cooling systems, appliances (e.g., coffee makers, refrigerators, ovens, washing machines, dryers, etc.), and the like. Each such device may be associated with one or more amenities of a property. For example, a light switch may be associated with a specific room (e.g., a kitchen or a game room). Thus, use of the light switch may indicate user activity within the room. As another example, an internet-connected device associated with (e.g., integrated into) a fireplace may be used to monitor use of the fireplace, or a network access point located within a specific room may be used to monitor user presence within the room (e.g. based on whether a network-connected device of the user, such as a mobile phone, is connected to the access point). In some instances, a device may be associated with multiple amenities. In some such instances, the device may gather information indicating a specific amenity that is in use. For example, where a wireless access point is usable from multiple rooms within a property, a signal strength of a user's mobile device may indicate which room the user is located in. In some instances, data from multiple devices may be combined to determine amenity usage. For example, signal strength from multiple access points or other wireless sensors may be combined to more accurately determine a room in which a user is present (e.g. via triangulation of their mobile device, signal interference patterns which are typical of a person walking in a room, etc.)

In addition to property-related devices, amenity usage in some instances may be gathered at or generated by user-related devices, such as mobile devices. For example, a user may be associated with a mobile phone configured (e.g., via an application on the phone) to monitor a user's location (e.g., in geographic coordinates, such as via the Global Positioning System, or "GPS"). The travel system may further maintain coordinates of various amenities of a property (e.g., as submitted by an owner of that property). The travel system may thus compare or correlate location information from a user's mobile device with location information for various amenities in order to determine amenity usage at the property by the user.

Privacy is generally an important concern of users of a travel service. Usage of network-connected devices (which may include, for example, cameras or other devices that capture sensitive information) can often increase this concern. The present disclosure can provide mechanisms to address and alleviate these concerns. For example, one embodiment of the present disclosure requires that both an owner of a property and all occupants of the property be notified of and consent to use of amenity-associates devices on the property, as well as to the use of amenity data generated by or from the amenity-associated devices. In one embodiment, a travel service may require that a property owner disclose and register any network-connected devices within a property with the travel service, prior to a listing of the property being placed on the travel service. Thus, each user of the travel service may be notified of any network-connected devices within a property prior to occupying the property. The travel service may, for example, require individual users to "opt-in" of use of network-connected devices or collection of amenity-use data during a stay, and disable the network-connected devices (e.g., in their entirety or with respect to certain function that the user declines to enable) during the user's stay if a user does not do so. Where amenity-use data is gathered from a user device, such as a mobile phone, the travel service may require the user to be notified and consent to collection of such data. In some instances, the travel service may encourage or require owners of travel properties to utilize "low information" devices to reduce privacy concerns of occupants. Low information devices may include, for example, devices that primarily collect information related to use of an amenity, with little or no additional information. For example, network-connected power switches, appliances, or basic motion sensors may be considered "low information" devices. In contrast, high information devices may be general-purpose data collection devices that collect significant information aside from that required to determine amenity usage. For example, cameras or microphones may be considered "high information" devices. While high information devices may be used to generate amenity-use data, these devices may also collect information such as the identity of an occupant, their appearance, their conversations, etc.—information which creates large privacy concerns. In one embodiment, the travel service may utilize only low information devices to generate amenity-use data. Furthermore, the travel service may restrict the ability of owners of a travel property to use high information devices, such as by banning or disabling such devices. Thus, embodiments of the present disclosure can be implemented in a manner that provides benefits to property owners and users without negatively impacting user's privacy.

In accordance with embodiments of the present disclosure, amenity-use data can be used to enhance various aspects of the travel service. Illustratively, amenity-use data for properties may be used to determine relative popularities of amenities at an individual property or across multiple properties. For example, where a given property includes multiple amenities, amenity-use data may be used to determine a relative use of those amenities by occupants, and to display information regarding the amenities based on (e.g., in an order of) relative use. Illustratively, where a property includes both a "hot tub" and a "game room," the travel system can use a relative popularity of the amenities (e.g., as determined from amenity-use data derived from or generated at amenity-associated devices) to display the more popular amenity (e.g., the "hot tub") prior to or instead of the less popular amenity (e.g., the "game room"). With respect to multiple properties, relative popularity of a given amenity may be used to distinguish between multiple properties purportedly providing the amenity. For example, where a user searches for properties with a specific amenity (e.g., a "hot tub"), the travel system may preferentially display a property whose hot tub is frequently used, as opposed to a property with a hot tub that is not used (which might indicate, for example, that the hot tub is in disrepair).

In some embodiments, amenity-use data may additionally or alternatively be used to determine user-specific amenity preferences. For example, where amenity-use data for a user has been collected from one or more prior property occupations, the travel system may determine amenity preferences from the user based on that use data (e.g., by maintaining a preference for a given amenity weighted based on past use of that type of amenity across prior properties). Thereafter, when a user searches for a property on the travel system, the travel system may conduct the search based at least partly on the amenity preferences of the user, potentially without requiring user specification of such preferences. For example, if a user searches for properties in a given location (e.g., "Austin, Tex."), the travel system search for or rank properties within search results on the basis of availability of a user's preferred amenity (e.g., such that properties with "hot tubs" are preferentially displayed where a user has, during past property occupations, used a hot tub of the past property).

As would be appreciated by one of skill in the art, the use of amenity-use data to conduct searches or identify properties on a travel system represents a significant advantage over prior implementations. Specifically, the use of amenity-use data, as disclosed herein, enables a travel system to locate and provide more accurate results in response to user searches. Illustratively, the results may more accurately reflect the accuracy and usability of amenities purported to be available at a property, or may more accurately reflect properties with amenities that the user prefers. This more accurate delivery of search results can improve usage of computing resources at a travel system by, for example, reducing the number of searches that are conducted by users to locate a desired property, reducing the amount of information transmitted to users by the travel system (e.g., during review of inaccurate results), etc. As such, the use of amenity-use information can enable a travel system to operate more efficiently, enabling the travel system to return relevant query results more quickly and with utilization of fewer computing resources. Moreover, as would be recognized by one skilled in the art, identification of relevant, accurate search results by a computing device is a long standing technical problem within the field of information retrieval, to which the presently disclosed embodiments (e.g., related to use of amenity-associated devices to monitor amenity-use information at properties, and to the use of such information in processing queries at a travel system) represent technical solutions. As such, the embodiments described herein represent significant improvements in computer-related technology.

Though examples are provided herein with respect to specific types of properties, such as vacation rentals, embodiments of the present disclosure may be applied to any occupiable property.

FIG. 1 is a block diagram depicting an illustrative operating environment in which a network-based travel system 150 enables customers to browse, search for, and acquire access to travel properties made available for occupation by third party providers or the operator of the travel system 150. As illustrated in FIG. 1, the operating environment includes one or more amenity-associated devices 120 and one or more user computing devices 110 in communication with a network-based travel system 150 via a network 130. An owner of a property that includes one or more amenity-associated devices 120 may utilize the travel system 150 to list that property as available for occupation by users of the travel system 150 (e.g., as a short term rental, long term rental, etc.). The travel system 150 may then make information regarding the property, as well as other properties or travel items, available to user computer devices 110. Accordingly, a user, using a user computing device 110, may browse the properties available for occupation as listed on the travel system 150, search for properties, and acquire, reserve, or book one or more access to occupy a desired property.

A user computing device 110 may be any computing device, such as a laptop or tablet computer, personal computer, server, personal digital assistant (PDA), hybrid PDA/mobile phone, mobile phone, electronic book reader, set-top box, camera, digital media player, and the like.

An amenity-associated device 120 may be any network-connected device providing information related to use of an amenity of a property by an occupant. Such devices 120 may include, for example, network-connected thermostats, light bulbs, light switches, entertainment devices (e.g., televisions, streaming content devices, game consoles, etc.), heating or cooling systems, appliances (e.g., coffee makers, refrigerators, ovens, washing machines, dryers, etc.), access points, voice recognition systems, speakers, voice-controlled digital assistants, and the like. In some instances, a user computing device 110 may act as an amenity-associated device 120 by, for example, providing location information of an occupant that the travel system 150 may correlate with a location of an amenity in order to derive amenity-use data. Thus, separate depiction of user computing devices 110 and amenity-associated devices 120 is for illustrative purposes.

The user computing devices 120 and the amenity-associated devices 120 may communicate with the travel system 150 via a network 130. Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are known to those skilled in the art of computer communications and thus, need not be described in more detail herein.

In the illustrated embodiment, the travel system 150 is illustrated as a computer environment including several computer systems that are interconnected using one or more networks. More specifically, the travel system 150 may include a user interface system 156, an amenity-associated device interface 152, a query processing system 154, a user profile data store 158, and a travel item data store 160. While shown in FIG. 1 as distinct systems, one or more of the user interface system 156, amenity-associated device interface 152, query processing system 154, user profile data store 158, and travel item data store 160 may, in some embodiments, be combined into one or more aggregate systems. Further, it will be appreciated by those skilled in the art that the travel system 150 could have fewer or greater components than are illustrated in FIG. 1, including various Web services and/or peer-to-peer network configurations. For example, amenity-associated devices 120 may be associated with additional network components, such as devices provided an application programming interface (API) through which to interact with the amenity-associated devices 120. In some embodiments, the one or more components of the travel system 150 may be implemented by virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. Thus, the depiction of the travel system 150 in FIG. 1 should be taken as illustrative and not limiting to the present disclosure.

Any one or more of the user interface system 156, the reservation systems interface 152, the query processing system 154, the user profile data store 158, and the travel item data store 160 may be embodied in a plurality of components, each executing an instance of the respective user interface system 156, amenity-associated device interface 152, query processing system 154, user profile data store 158, and travel item data store 160. A server or other computing component implementing any one of the user interface system 156, the amenity-associated device interface 152, the query processing system 154, the user profile data store 158, and the travel item data store 160 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective user interface system 156, amenity-associated device interface 152, query processing system 154, user profile data store 158, and travel item data store 160. The memory may generally include RAM, ROM, other persistent and auxiliary memory, and/or any non-transitory computer-readable media.

In accordance with embodiments of the present disclosure, the amenity-associated device interface system 152 can be configured to interface with amenity-associated devices 120, each of which may be associated with one or more amenities at an occupiable property. In one embodiment, some or all of the amenity-associated devices 120 are under control of an owner of a property, and the owner may contact the travel system 150 to identify the amenity-associated devices 120 and the amenities with which the devices are associated. For example, an owner of a property may provide the travel system 150 with an identifier of an amenity-associated device 120 (e.g., a network address, serial number and model number, etc.), and designate an amenity with which the device 120 is associated (e.g., a specific room). In some embodiments, the owner may further specify state information for the device 120 indicative of use (e.g., a state of "Play Movie" for an entertainment system device 120 may indicate use). In other embodiments, the system 150 may be configured to automatically determine state information indicative of use for a device 120 (e.g., such that a state of "on" is predetermined to indicate use). In some instances, the amenity-associated device interface system 152 may communicate with amenity-associated devices 120 through a third-party device or service (e.g., provided by a manufacturer of a device 120). Thus, the system 150 may enable an owner to provide account information associated with the device 120, after which the travel system 150 may query the third-party device or service for information regarding the device 120 or a state of the device 120. For example, where the device 120 is a GOOGLE HOME™ virtual digital assistant, the travel system 150 may query an interface associated with that type of device for information regarding the device 120. Where a device 120 is controlled via a "hub," such as the SAMSUNG SMART-THINGS™ or WINK™ hubs, the system 150 may query such a hub for information regarding the device 120.

The amenity-associated device interface system 152 is illustratively configured to use data received from amenity-associated device 120 to determine amenity-use information for a property, and to use such information to maintain information regarding the travel property, profiles regarding users of the system 150, or both. Specifically, the amenity-associated device interface system 152 may determine, from data received from amenity-associated devices 120, individual amenities of a property used during occupation of that property, as well as information regarding such use (e.g., timing of use, duration of use, etc.). The amenity-associated device interface system 152 may then update information regarding the travel property to reflect use of those individual amenities. In one example, the amenity-associated device interface system 152 may record, for a given amenity of a given property, a frequency of occupants that utilize the amenity and an average duration or frequency of use of the amenity (e.g., over a course of a stay). In some instances, the amenity-associated device interface system 152 may ensure that information related to amenity-use at a given property is anonymized, to protect the privacy of occupants of the property. The information regarding the property can be stored within a travel property data store 160. The travel property data store 160 can correspond to any physical data store, collection of physical data stores, or virtual data store implemented by one or more physical data stores, such as hard disk drives (HDDs), solid state drives (SSDs), tape drives, network attached storage (NASs) or any other persistent or substantially persistent storage component.

Additionally or alternatively, the amenity-associated device interface system 152 is illustratively configured to use data received from amenity-associated device 120 to determine amenity-use information associated with an individual user. Illustratively, where a user (e.g., using a user computing device 110) acquires authorization to occupy a property using the travel system 150, the travel system 150 may be aware of a time span in which the user is authorized to access the property. Thus, during that span, the amenity-associated device interface system 152 may retrieve amenity-use data from amenity-associated devices 120 and determine from the data amenity use of the user. The amenity-associated device interface system 152 may thereafter determine amenity preferences of the user based on the amenity use data. Illustratively, for a given amenity (or amenity type), the amenity-associated device interface system 152 may determine whether the user uses the amenity and a frequency or duration of use of the amenity by the user. Thus, for example, the amenity-associated device interface system 152 may determine preferences of the user for specific types of amenities. In some instances, the amenity-associated device interface system 152 may ensure that information related to amenity-use by a user is generalized, to protect the privacy of the user. For example, rather than storing specific information regarding amenity use, the amenity-associated device interface system 152 may store only a generalized preference of the user of a given amenity which may, for example, reflect a generalized tendency of the user to use an amenity. The information regarding the user can be stored within a user profile data store 158. The user profile data store 158 can correspond to any physical data store, collection of physical data stores, or virtual data store implemented by one or more physical data stores, such as hard disk drives (HDDs), solid state drives (SSDs), tape drives, network attached storage (NASs) or any other persistent or substantially persistent storage component. In some instances, the user profile data store 158 and the travel property data store 160 are implemented within a common storage device.

The travel system 150 further includes a query processing system 154 configured to utilize amenity-use data (e.g., as stored within the user profile data store 158 and/or the travel property data store 160) to facilitate searches, by users of user computing devices 110, for travel properties. In one embodiment, the query processing system 154 applies amenity-use data to preferentially return, in response to a query for a travel property with a specific amenity or amenity type, a travel property having the specific amenity and also associated with amenity-use data showing a high usage of the amenity relative to other properties. For example, where a user computing device 110 submits a search for travel properties associated with a "fireplace," the query processing system 154 may identify as search results a set of travel properties having a fireplace amenity. The system 154 may further rank or order the travel properties based on use of the fireplace, as indicated within the amenity-use data. In another embodiment, the query processing system 154 applies amenity-use data to preferentially display property amenities within a set of search results. For example, where a listing of search results identifies a property along with a subset of amenities of the property, the query processing system 154 may select the subset of amenities based on a ranking or ordering of amenities of the property according to use of those amenities (e.g., as the top N amenities based on use). In yet another embodiment, the query processing system 154 utilizes amenity-use data to return, in response to a search query from a user of a user computing device 110, properties with amenities matching amenity preferences of the user, as determined based on past amenity-use data collected during the user's occupation of past travel properties. For example, where such amenity-use data indicates that a user has, in the past, frequently utilized a first type of amenity (e.g., a "fireplace"), the query processing system 154 may conduct a search for travel properties having a fireplace, or may rank search results to preferentially display properties having a fireplace. In some instances, this process may occur without explicit request from the user to search for properties with a preferred amenity.

Submissions to the query processing system 154 may be submitted by user computing devices 110 via the user interface system 156, which may also transmit query results to the user computing devices 110. Accordingly, the user interface system 156 may facilitate searching for, browsing for, and acquisition of access to (e.g., by reservation, booking, etc.) travel properties by users via user computing devices 110. In some embodiments, the user interface system 156 may include a network server, such as a web server, for generation of instructions for presentation by recipient devices of network pages (e.g., web pages) facilitating such searching, browsing, and acquisition. For example, a web page may list a set of travel properties identified in response to a search query, as well as amenities of the individual properties within the set (e.g., a subset of all amenities of the individual property).

The user interface system 156 may further be configured to facilitate submission or retrieval of other information from the travel service 150. For example, the user interface system 156 may be configured to enable users to submit amenity preferences to the travel service 150. In one embodiment, the user interface system 156 enables owners of properties to submit information regarding amenity-associated devices 120 of properties. For example, user interface system 156 can enable owners to submit identifying information for a device 120 (e.g., a network address, a serial number, a uniform resource identifier ["URI"], etc.), authentication information for the device 120, information regarding one or more amenities associated with the device 120, or information enabling a travel system 150 to determine amenity use based on data received from the device 120. The information enabling a travel system 150 to determine amenity use based on data received from the device 120 might include, for example, potential states of the device (e.g., "On," "Off," etc.) as well as whether each state indicates amenity use or potential values indicative of which amenity is being used (e.g., which wireless signal strength values indicate usage of which amenity). In one embodiment, the user interface 156 may enable an owner to "calibrate" devices 120 on a property, such as by prompting the owner to use an amenity, and recording values received from a device 120 as indicative of use of the amenity.

Figure 2:
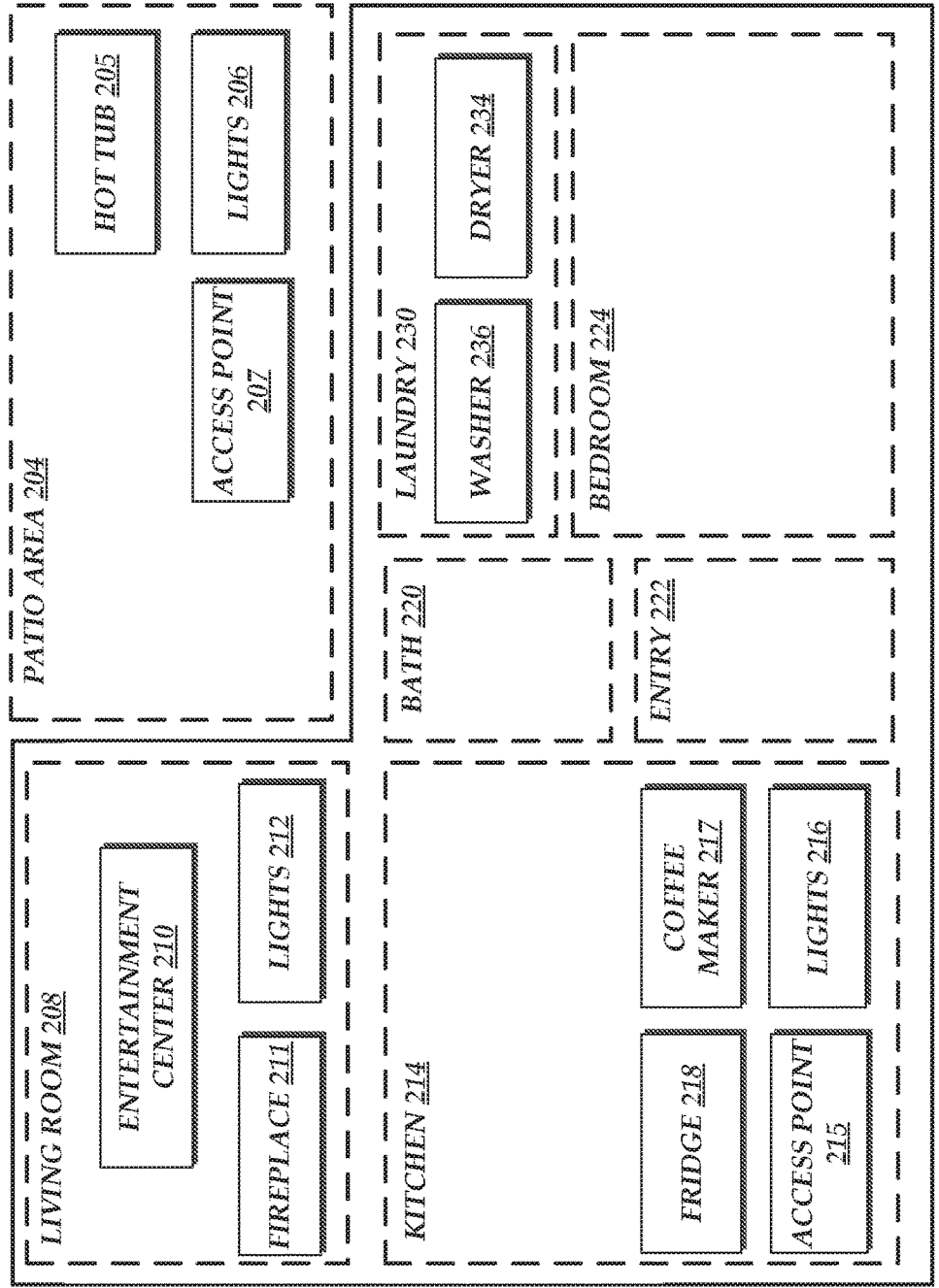
FIG. 2 is an illustrative block diagram of a layout of a travel property, including a number of amenity-associated devices that can be used in the generation amenity-use information for the travel property by the travel service of FIG. 1.

One illustrative configuration of a travel property is shown in FIG. 2, as travel property 202. The illustrative travel property 202 may be, for example, a house including a living room 208, kitchen 214, bathroom 220, entry area 222, laundry room 230, bedroom 224, and patio area 204. Each such room may be considered an amenity of the property 202. Rooms of the property 202 are shown within FIG. 2 in dashed lines. The property 202 can further include a set of amenity-associated devices 102, such as an entertainment center 210, fireplace 211, living room lights 212, hot tub 205, patio area wireless access point 207, patio area lights 206, kitchen wireless access point 215, kitchen lights 216, coffee maker 217, refrigerator 218, clothes washing machine 236, and clothes dryer 234. Each of the above amenity-associated devices 120 can represent a network-enabled device capable of conveying status information to the travel system 150 (e.g., directly, through an intermediary service, etc.). In some instances, amenity-associated devices 120 may be capable of internet protocol (IP) communications. One or more of the amenity-associated devices 120 may, for example, be "WiFi-enabled," and capable of communicating via the IEEE 802.11 family of wireless local area network standards. In other instances, the amenity-associated devices 120 may be capable of communications via other protocols, such as the Z-WAVE™ protocol, the ZIGBEE™ protocol, the X10 protocol, the BLUETOOTH™ protocol, or the like.

Each amenity-associated device 120 shown in FIG. 2 may be associated with one or more amenities. For each, each amenity-associated device 120 in FIG. 2 may be associated with a room in which it is contained. In some instances, an amenity-associated device 120 may be associated with multiple amenities. For example, the kitchen wireless access point 215 may be accessible from multiple rooms (e.g., the kitchen 214, the living room 208, etc.). Data provided by the kitchen wireless access point 215 may enable a receiving device (e.g., the travel system 150) to distinguish an amenity use indicated within the data. For example, where a user device (e.g., a mobile phone) is in communication with the kitchen wireless access point 215 and has a signal strength above a threshold value, such data may indicate use of the kitchen. Signal strengths of various ranges may be associated with different rooms of the property 202. In some instances, data received from a device 120, such as the access point 215, may be ambiguous. For example, a mobile device in the living room 208 and the entry area 222 may be associated with an overlapping range of signal strength with respect to the access point 215. In some embodiments, the travel system 150 can identify a specific amenity in use by combining data received from a first amenity-associated device 120, such as the access point 215, with data received from a second amenity-associated device 120. For example, a combination of a first signal strength between a mobile device and the access point 215 and a second signal strength between the mobile device and the access point 207 may enable the travel system 150 to differentiate whether the mobile device is located within the living room 208 or the entry area 222. In some embodiments, an amenity-associated device 120 may be integrated within or itself be an amenity. For example, a network-connected fireplace 211 or hot tub 205 may be amenities in their own right. In other embodiments, multiple amenity-associated devices 120 may indicate use of a given amenity. For example, both wireless access points 207 and 215 may indicate use of a wireless network amenity.

While a variety of potential amenity-associated devices 120 are depicted in FIG. 2, the specific configuration of amenity-associated device 120 may vary across travel properties. For example, the rooms of a travel property may include more or fewer amenity-associated devices 120 than shown in FIG. 2, or a travel property may have more or fewer rooms than shown in FIG. 2. In some instances, the travel system 150 may impose restrictions on properties with respect to amenity-associated devices 120 or placement of such devices 120. For example, to protect the privacy of occupants, the system 150 may prohibit all or certain types of devices 202 within various areas. Illustratively, the system 150 may prohibit cameras, microphones, or devices that might capture sensitive information from areas with high expectations of privacy, such as bathrooms or bedrooms. In one embodiment, the travel system 150 may provide to users a list of any amenity-associated devices 120 associated with a property (e.g., within a listing of information of the property). For example, the travel system 150 may provide a floor plan of the property indicating amenity-associated devices 120 of the property and their location within the floor plan. Thus, users can be fully notified regarding use of amenity-associated devices 120 at the property. As noted above, the travel system 150 may in some instances require consent from users as to the amenity-associated devices 120 or provide other mechanisms to manage privacy of users. For example, the travel system 150 may enable a user to selectively deactivate individual amenity-associated devices 120 at a property, thus ensuring occupants' privacy with respect to such devices 120.

Figure 3:
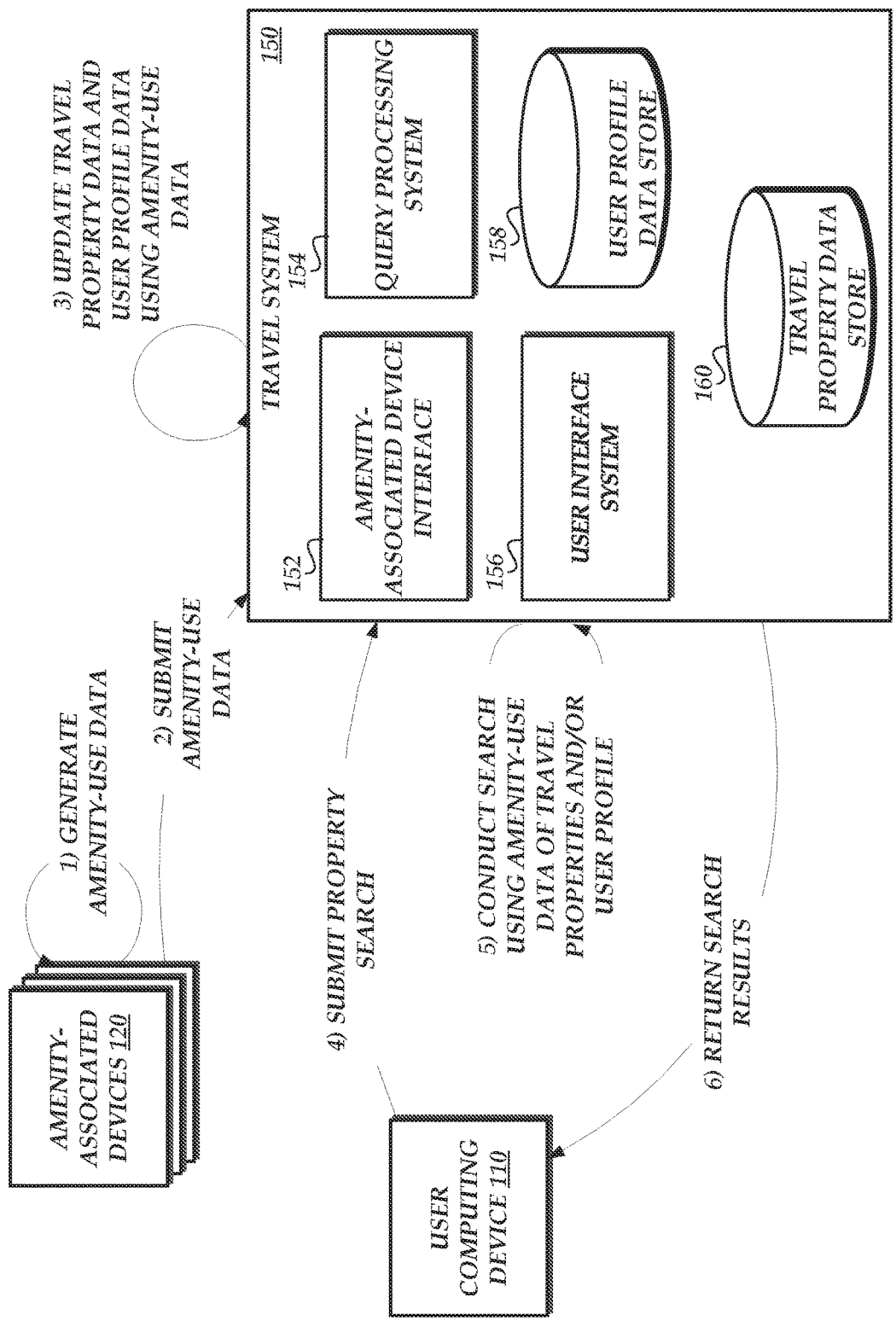
FIG. 3 is an illustrative flow diagram for selecting, at the travel service of FIG. 1, travel property information to display in response to a search query based at least partly on amenity-use information for a travel property, a user, or a combination thereof.

Illustrative interactions for utilization of amenity-use data at a travel system 150 are depicted within FIG. 3. Specifically, the interactions of FIG. 3 can enable a travel system 150 to generate or gather amenity-use data from amenity-associated devices 120 at one or more travel properties, and to apply the amenity-use data to the generation of information regarding travel properties at the travel system 150 (e.g., in connection with display of search results). For the purposes of illustration, it will be assumed that each of the amenity-associated devices 120 in FIG. 3 is associated with a single travel property. However, similar interactions may occur for any number of travel properties.

The interactions of FIG. 3 begin at (1), where amenity-associated devices 120 at one or more properties generate amenity-use data. This data may include, for example, a state of an amenity-associated device 120 (e.g., "on," "off," etc.), information indicating a state of occupancy of a travel property in which the device 120 is located (e.g., a set of wireless devices connected to an access point), or other information indicative of use of an amenity at the property. At (2), the amenity-associated devices 120 submit the amenity-use data to the travel system 150 (e.g., to the amenity-associated device interface 152). In one embodiment, the amenity-associated devices 120 are configured to initiate submission of amenity-use data to the travel system 150. For example, an amenity-associated device 120 may continuously or periodically submit amenity-use data to an application programming interface (API) of the travel system 150. In another embodiment, the travel system 150 is configured to query (e.g., periodically) the amenity-associated devices 120 for amenity-use data. While interaction (2) is depicted in FIG. 3 as between amenity-associated devices 120 and the travel system 150, in some embodiments communication between the amenity-associated devices 120 and the travel system 150 may be facilitated by an additional device, such as a home automation "hub" device within a travel property or a network-based controller device associated with one or more amenity-associated devices 120 (e.g., a controller operated by a manufacturer of an amenity-associated device 120).

At (3), the travel system 150 uses the received amenity-use data to update either travel property data, user profile data, or both. With respect to travel property data, the travel system 150 may illustratively update information for a travel property associated with the amenity-associated devices 120, to reflect usage of amenities within the travel property. For example, the travel system 150 may inspect each portion of amenity-use data (e.g., as received from a given amenity-associated device 120) and determine whether the data indicates use of an amenity within the travel property. The specific amenity associated with amenity-use data may be based, for example, on a predetermined association between an amenity-associated device 120 generating the data and the amenity (e.g., as specified by an owner of the property, as automatically determined at the travel system 150 based on a known relationship between a type of the amenity-associated device 120 and an amenity, etc.). In another example, the specific amenity associated with amenity-use data may be based on information received from the amenity-associated device 120. Illustratively, GPS coordinates received from a mobile device may be used to determine a room in which the mobile device is located, indicating use of that room. As another illustration, signal strength data from one or more wireless access points to a mobile device may similarly be used to determine a room in which the device is located.

The travel system 150 may further utilize the data to determine aspects of an amenity's use, such as a frequency or duration of use. For example, where the received data is associated with a fireplace, the travel system 150 may determine how often or how long the fireplace was lit. The travel system 150 may then update information regarding the travel property to include an indication of that amenity use. Illustratively, the travel system 150 may update travel property information to indicate a percentage of occupants of the property that utilize the fireplace, an average frequency of that use (e.g., times per day), and an average duration of the use. In one embodiment, the travel system 150 may consider only amenity-use data generated during a known occupancy of the travel property (e.g., during a time period in which a user of the travel system 150 has acquired access to the property). As such, information for a travel property may be updated to indicate, for example, a percentage of occupants that utilized each amenity of the property during their stay, or a relative popularity of amenities of a property (e.g., based on a comparison of percentages of use, time of use, frequency of use, etc.).

The information stored with respect to a travel property may be anonymized by averaging over all occupants of the property, to ensure privacy of individual occupants. In one embodiment, the travel system 150 may be configured to prevent disclosure of amenity-use information for a property until a sufficient amount of information has been gathered to ensure anonymity.

In addition or alternatively to updating information regarding a travel property, the travel system 150 may also update travel profile data for known occupants of the travel property during a time of generation of the amenity-use data. For example, where the amenity-use data is generated during a time in which a user has used the travel system 150 to acquire access to a travel property, the amenity-used data may be used to determine or update the user's preferences for amenities. Illustratively, the travel system 150 may maintain, for each of a number of amenities or amenity types, a preference of the user for the amenity, as determined based on a history of use of the amenity in a travel property during a known occupancy of the user at the travel property. The history of use may reflect, for example, a frequency or duration of use of the amenity at past properties in which the user has stayed. Thus, if a user frequency utilizes a specific amenity (e.g., a kitchen) of a travel property, the travel system 150 may associate the user with a high preference for the amenity. If the user does not frequently use another amenity (e.g., a laundry machine), the travel system 150 may associate the user with a low preference for the amenity. Preferences may be stored, for example, as a percentage of use of an amenity, a frequency of use of an amenity, a total duration of use of an amenity, or as a relative strength indicator (e.g., established based on thresholds related to one or more of percentage, frequency, or duration of use). Thus, by gathering amenity-use data during a user's stay at a property, the travel system 150 is enabled to determine preferences of the user for various amenities.

Returning to the interactions of FIG. 3, at (4), a user computing device 110 submits a property search query to the travel system 150. The search query may include criteria enabling the travel system 150 to search for and identify travel properties (e.g., as identified within the travel property data store 160) responsive to the query. The criteria mat include, for example, a desired location, dates in which occupation is desired, a desired price range, a desired capacity (e.g., in terms of supported occupants, number of rooms, etc.), or the like. In some instances, the criteria may include desired amenities, such as having a kitchen, fireplace, wireless internet access, or the like.

At (5), the travel system 150 conducts a search for travel properties based on the criteria, and using amenity-use data as integrated, for example, into travel property information, a user profile of a user associated with the user computing device 110, or both. In one embodiment, the travel system 150 applies amenity-use data in identifying travel properties responsive to the search. For example, where the search criteria specifies a desired amenity, the travel system 150 may conduct a search for travel properties where the desired amenity is frequently or popularly used (e.g., with a history of use meeting a given threshold, which may for example be progressively relaxed to ensure a sufficient number of search results). Additionally or alternatively, where a user of the user computing device 110 is associated with amenity-use data indicating a preference for one or more amenities, those preferences may be integrated into the search. For example, a user preference for a "fireplace" amenity may cause the travel system 150 to search for travel properties with a fireplace, or with a fireplace that has historically been frequently or popularly used by occupants. In one embodiment, a strength of preference for an amenity, as determined from past amenity-use data associated with a user, may be used by the travel system 150 to set a desired threshold for the amenity within a search. Illustratively, where past amenity-use data of a user indicates a strong preference for a fireplace, the travel system 150 may search for travel properties with a fireplace frequently used by past occupants.

In other embodiments, the travel system 150 applies amenity-use data in determining how to display travel properties responsive to the search. For example, the travel system 150 may apply search criteria in order to identify travel properties responsive to the search (e.g., either with or without respect to amenity-use data of the user and/or travel properties), and thereafter use amenity-use data with respect to the user or the property in order to modify how such travel properties are displayed. In one embodiment, the travel system 150 determines an ordering or ranking of travel properties within a set of search results based on a comparison of a user's amenity preferences (e.g., as determined based on amenity-use data or explicitly specified by the user, such as within the search query) to amenity usage of the travel properties within the search results. For example, if a user is determined to have a preference for fireplace amenities, the travel system 150 may order search results based at least partly on a frequently or popularity of fireplaces amenities of each travel property, such that a travel property with a frequently or popularly used fireplace is more likely to be placed at the top of the search results. In another embodiment, the travel system 150 determines what information regarding a travel property to display within a set of search results based at least partly on amenity-use data for the property, amenity preferences of the user, or a combination thereof. For example, where a search results page displays a subset of amenities of a travel property, the travel system 150 may select the subset based at least partly on frequently or popularity of the amenities of the property. In some instances, the travel system 150 may omit from the subset specific types of amenities, such as amenities that are shared among all or a large portion of the search results (e.g., kitchens), in order to highlight unique or uncommon popular amenities of a travel property. As another example, where a user associated with a search has a preference for a specific amenity (e.g., as explicitly indicated by inclusion of the amenity within the search criteria, as automatically determined based on historical amenity-use data, etc.), the travel system 150 may select an amenity matching that preference for inclusion within the subset of amenities for the property displayed within search results. For example, where a user has a preference for a "game room" amenity, the travel system 150 may select such an amenity, where present at a travel property, for inclusion within the subset of amenities displayed for the travel property within search results. Thus, the travel system 150 may utilize past amenity-use data in order to modify an ordering or ranking of search results, to provide the most relevant results to a user.

After determining a set of search results, the results are transmitted to the user computing device 110 at (6). In one embodiment, the search results are presented within a display page, such as a web page, that includes information regarding one or more travel properties identified as responsive to the search result. In one embodiment, the search results indicate anonymized usage data for individual amenities of the travel properties. For example, the results may indicate that a specific amenity at a travel property is "very popular" or that an amenity is "not popular." The page may be generated, for example, by the user interface system 156.

In accordance with the foregoing description, the travel property may be selected on the basis of past amenity-use data, thus increasing the expected relevance of the search results as compared to techniques not utilizing amenity-use data.

Figure 4:
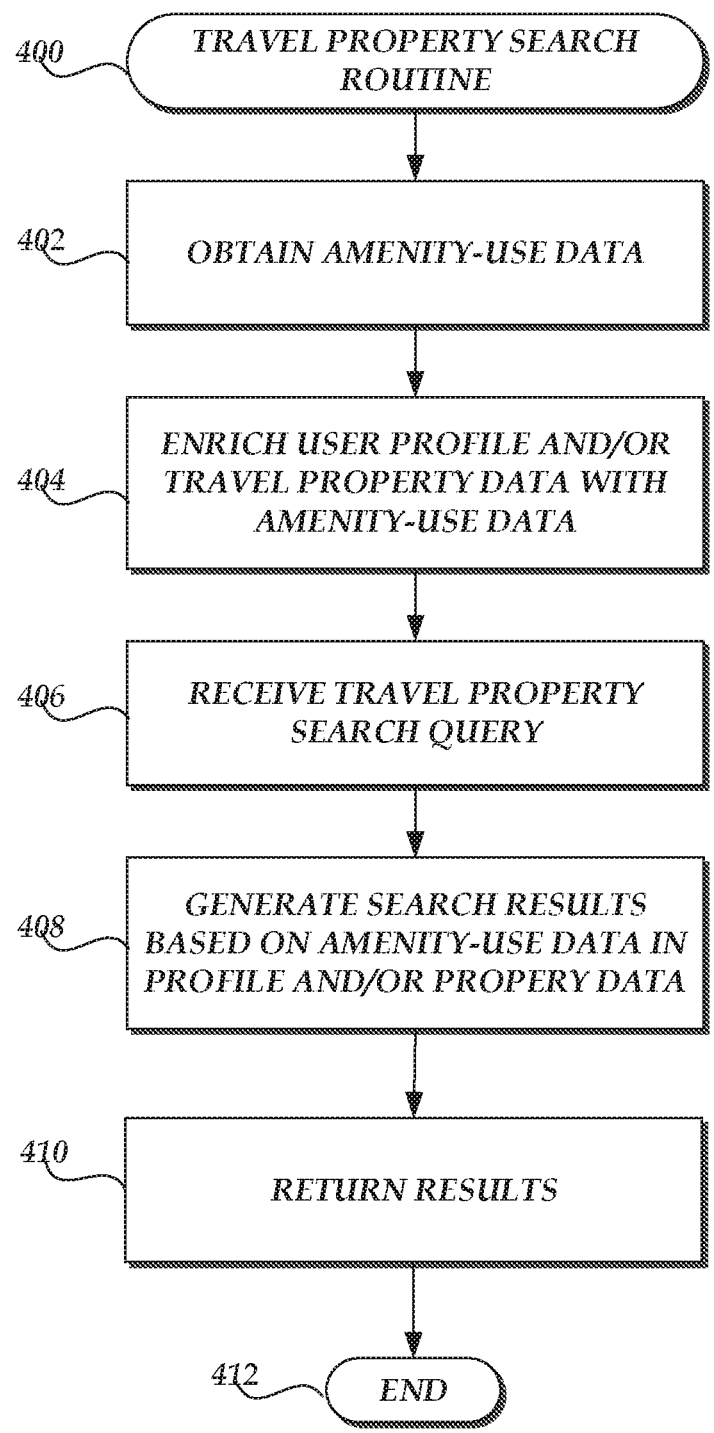
FIG. 4 depicts an illustrative routine that may be used by the travel service of FIG. 1 to select travel property information to display in response to a search query based at least partly on amenity-use information for a travel property, a user, or a combination thereof.

With reference to FIG. 4, an illustrative routine 400 is depicted for conducting travel property searches based at least partly on amenity-use data of the properties. The routine 400 can be carried out, for example, by the travel system 150 of FIG. 1.

The routine 400 begins at block 402, where the travel system 150 obtains amenity-use data regarding one or more travel properties from amenity-associated devices 120. As discussed above, the amenity-associated devices 120 may be associated with an individual property (e.g., as home automation devices within the property) or may be associated with an individual user (e.g., as a mobile device of the user). The amenity-use data may include information enabling the travel system 150 to determine use of an amenity of a property, such as a location of the amenity-associated device 120 and a state of the amenity-associated device 120.

At block 404, the travel system 150 utilizes the amenity-use data to enrich user profiles of one or more users associated with the amenity-use data, to enrich travel property data of a travel property associated with the amenity-use data, or both. Illustratively, where all or a portion of the amenity-use data is associated with a user of the travel system 150, the travel system 150 may utilize the amenity-use data to generate or update preferences of the user for specific amenities. The preference may be represented, for example, as a past frequency or duration of use of an amenity, an indication of a likelihood of use of an amenity by the user when occupying a property providing the amenity, or a metric derived from these inputs (e.g., as a anonymized "high," "medium," or "low" preference based on thresholds associated with a past frequency, duration, or likelihood of use). Where all or a portion of the amenity-use data is associated with a given travel property on the travel system 150, the travel system 150 may utilize the amenity-use data to generate or update travel property data for the travel property, indicating usage of one or more amenities. The indicating of usage of an amenity may be represented, for example, as a past frequency or duration of use of an amenity, an indication of a likelihood of use of an amenity by an occupant when occupying a property providing the amenity, or a metric derived from these inputs (e.g., as a anonymized "high," "medium," or "low" frequency or popularity of use based on thresholds associated with a past frequency, duration, or likelihood of use).

At block 406, the travel system 150 receives a search query for travel properties. The query may illustratively be submitted by a user of the travel system 150, and may indicate criteria for selection of travel properties responsive to the search. The criteria may, in some instances, include preferences for amenities within travel properties. Additionally or alternatively, the travel system 150 may enrich or modify the criteria to include preferences for amenities determined based at least partly on past amenity-use data associated with the user, as may be included within a user profile of the user.

At block 408, the travel system 150 generates search results for the search, based on amenity-use data of the travel properties, the user, or both. In one embodiment, the travel system 150 applies amenity-use data to search for travel properties. For example, where the search criteria includes a preference for an amenity, the travel system 150 may search for properties having the amenity and also having amenity-use data that indicates a threshold usage of the amenity among past occupants (e.g., as a threshold duration, frequency, or likelihood of use). In one embodiment, the threshold usage is set based at least partly on a strength of preference for the amenity. For example, a strong preference for an amenity may establish a high threshold use, while a weak preference for the amenity may establish a lower threshold use. In another embodiment, the travel system 150 applies amenity-use data to order or rank travel properties responsive to the search. For example, the travel system 150 may order travel properties within a set of search results based on a frequency of use or popularity of a preferred amenity. Additionally or alternatively, the travel system 150 may modify the information displayed within search results for individual properties based on amenity-use data. For example, the travel system 150 may display a subset of amenities of a property that are frequently or popularly used, along with an indication of such frequent use or popularity. As another example, the travel system 150 may display a subset of amenities of a property that are preferred by a searching user, such that the user can quickly determine, for the search results, that a property has (or does not have) a desired amenity.

At block 410, the results are returned to a user (e.g., at a user computing device). The results may be returned, for example, in the form of a display page presenting information regarding the travel properties as well as amenities of the travel properties. Because the results are generated based on amenity-use data of the properties, the user, or both, the results can be expected to be increased in relevancy and accuracy, thus improving operation of the travel system 150 to locate and present search results relative to prior techniques.

Figure 5:
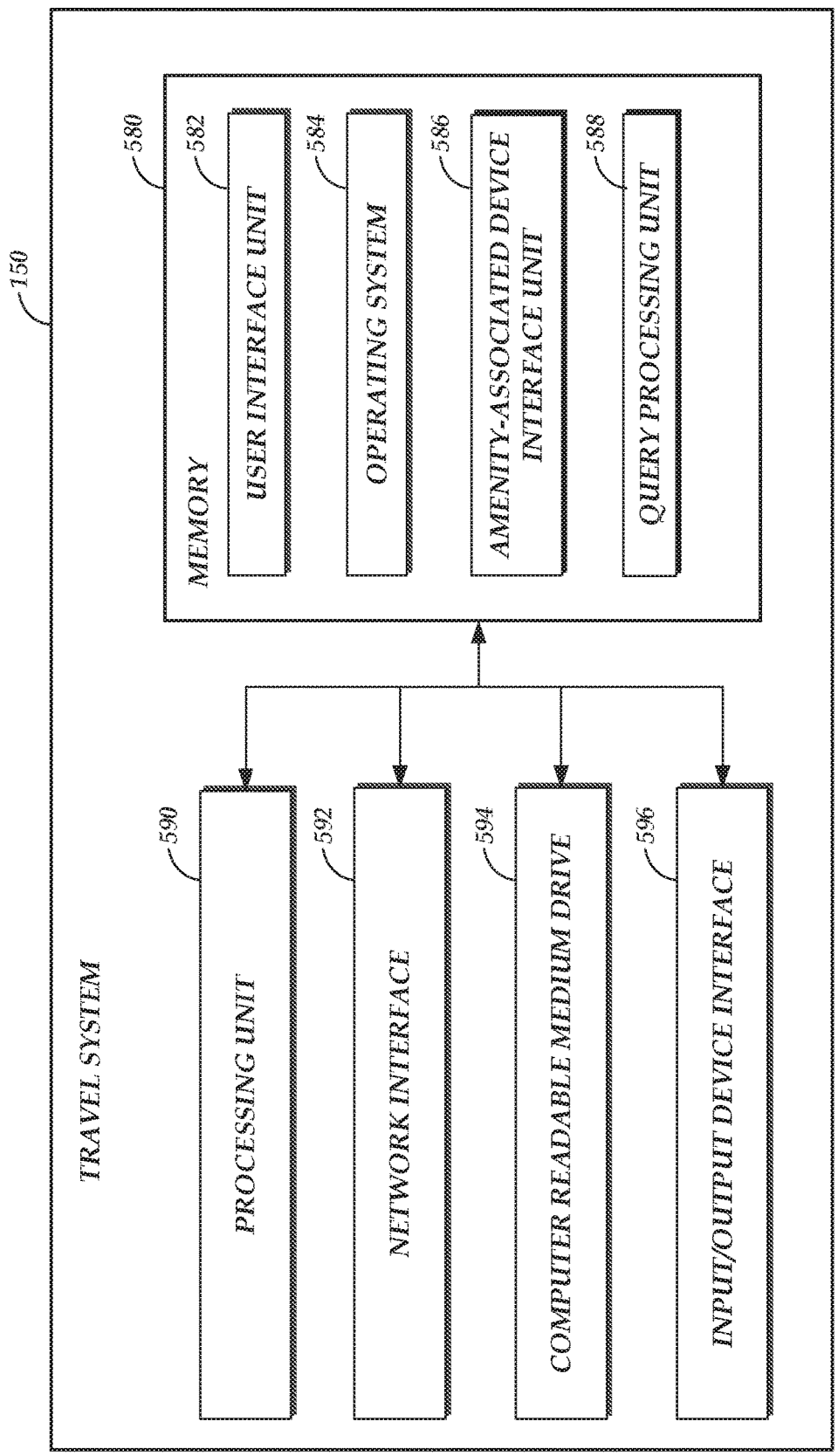
FIG. 5 depicts a general architecture of a computing device providing a travel system of FIG. 1.

FIG. 5 depicts a general architecture of a computing system (referenced as travel system 150) that functions to facilitate searching of travel properties based on amenity-use data for the travel properties, as collected from amenity-associated devices. The general architecture of the travel system 150 depicted in FIG. 5 includes an arrangement of computer hardware and software modules that may be used to implement aspects of the present disclosure. The hardware modules may be implemented with physical electronic devices, as discussed in greater detail below. The travel system 150 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1. As illustrated, the travel system 150 includes a processing unit 590, a network interface 592, a computer readable medium drive 594, and an input/output device interface 596, all of which may communicate with one another by way of a communication bus. The network interface 592 may provide connectivity to one or more networks or computing systems. The processing unit 590 may thus receive information and instructions from other computing systems or services via the network 130. The processing unit 590 may also communicate to and from memory 580 and further provide output information for an optional display (not shown) via the input/output device interface 596. The input/output device interface 596 may also accept input from an optional input device (not shown).

The memory 580 may contain computer program instructions (grouped as modules in some embodiments) that the processing unit 590 executes in order to implement one or more aspects of the present disclosure. The memory 580 generally includes random access memory (RAM), read only memory (ROM) and/or other persistent, auxiliary or non-transitory computer readable media. The memory 580 may store an operating system 584 that provides computer program instructions for use by the processing unit 590 in the general administration and operation of the travel system 150. The memory 580 may further include computer program instructions and other information for implementing aspects of the present disclosure. For example, in one embodiment, the memory 580 includes a user interface unit 582 that generates user interfaces (and/or instructions therefor) for display upon a computing device, e.g., via a navigation and/or browsing interface such as a browser or application installed on the computing device. In addition, the memory 580 may include and/or communicate with one or more data repositories (not shown), for example, to access information regarding travel properties or users of the travel system 550.

In addition to and/or in combination with the user interface unit 582 and the operating system 584, the memory 580 may include an amenity-associated device interface unit 586 and a query processing unit 588. In one embodiment, the amenity-associated device interface unit 586 and a query processing unit 588 individually or collectively implement various aspects of the present disclosure, e.g., facilitating retrieval of amenity-use information from amenity-associated devices and searching of travel properties based at least partly on the amenity-use information. For example, amenity-associated device interface unit 586 may be executed by the processing unit 590 in order to interact with amenity-associated devices or intermediary devices providing amenity-use data generated at the amenity-associated devices. The query processing unit 588 may be executed by the processing unit 590 to identify travel properties responsive to a search query based at least partly on amenity-use data of the properties, a user submitting the query, or a combination thereof.

The various illustrative logical blocks, routines, and algorithms described in connection with the embodiments disclosed herein can be implemented as electronic hardware or computer software executing on electronic hardware. To illustrate this, various illustrative components, blocks, modules, and steps have been described above generally in terms of their functionality. Whether such functionality is implemented as hardware or software executed via hardware depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module may generally correspond to a collection of computer-executable instructions enabling a computing device to implement a desired functionality. Software modules can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for identifying travel properties in response to user queries based at least partly on amenity-use data associated with the travel properties, the system comprising:
    a data store including information regarding a travel property, the information identifying an amenity of the travel property;
    an amenity-associated device interface configured to at least receive, from one or more amenity-associated devices associated with the travel property, amenity-use data indicating use of the amenity of the travel property;
    a search query interface configured to receive, from a user computing device associated with a user, a search query; and
    a processor in communication with the amenity-associated device interface and the search query interface and configured to at least:
        based at least partly on the amenity-use data, modify the information within the data store to indicate use of the amenity of the travel property;
        determine a preference of the user for the amenity;
        include the travel property within search results for the search query based at least on part on the preference of the user for the amenity and a determination that the information regarding the travel property indicates a past frequency of use of the amenity; and
        return the search results to the user computing device, wherein display of the search results on the user computing device causes display of an indication of the past frequency of use of the amenity of the travel property.

2. The system of claim 1, wherein the one or more amenity-associated devices comprise a home automation device, a network-connected appliance, a mobile telephone, a wireless access point, a network-connected light, a network-connected electrical switch, a network-connected motion detector, a network-connected thermostat.

3. The system of claim 1, wherein the amenity-use data includes at least one of a state of the one or more amenity-associated devices, other devices in communication with the one or more amenity-associated devices, or signal strength of the other devices.

4. The system of claim 1, wherein the processor is further configured to at least process the amenity-use data to determine the use of the amenity.

5. A computer-implemented method comprising:

receiving amenity-use data generated at one or more amenity-associated devices at a travel property, amenity-use data indicating use of the amenity of the travel property;

based at least partly on the amenity-use data, modifying a set of information regarding the travel property to indicate use of the amenity;

receiving, from a user computing device associated with a user, a travel property search query including search criteria;

based at least in part on the search criteria, generating search results for the search query, wherein generating the search results comprises including the travel property within search results based at least on part on a past frequency of the amenity, as determined based at least partly on the indicated use of the amenity within the set of information for the travel property; and transmitting the search results to the user computing device.

6. The computer-implemented method of claim 5, wherein the one or more amenity-associated devices comprise a mobile device of the user, wherein the amenity-use data includes coordinates of the mobile device, and wherein the computer-implemented method further comprises identifying the amenity based at least partly on a comparison of the coordinates with the coordinates of the amenity.

7. The computer-implemented method of claim 5, wherein the amenity-use data is received from the one or more amenity-associated devices.

8. The computer-implemented method of claim 5, wherein the amenity-use data is received from an intermediary device, the intermediary device comprising at least one of a home automation hub of the travel property or a network-based controller located remote from the travel property.

9. The computer-implemented method of claim 5, wherein the search results identify a plurality of travel properties responsive to the search query, including the travel property, and wherein the plurality of travel properties are ranked within the search results based at least partly on past frequencies of use for the amenity within respective travel properties of the plurality of travel properties.

10. The computer-implemented method of claim 9, wherein the past frequency of use for the amenity at an individual property is determined from at least one of a percentage of past occupants of the travel property that have used the amenity or an average frequency of use of the amenity by individual past occupants over a specified period of time.

11. The computer-implemented method of claim 5 further comprising:

determining a preference of the user for the amenity;

including the preference within the search criteria; and identifying the travel property for inclusion within the search results based partly on the search criteria including the preference for the amenity.

12. The computer-implemented method of claim 11, wherein determining the preference of the user for the amenity comprises identifying, within historical information for the user, a history of use of the amenity within other travel properties.

13. Non-transitory computer-readable media comprising computer-executable instructions that, when executed on a computing system, cause the computing system to:

receive amenity-use data generated at one or more amenity-associated devices at a travel property, amenity-use data indicating use of the amenity of the travel property;

based at least partly on the amenity-use data, modify a set of information regarding the travel property to indicate use of the amenity;

receive, from a user computing device associated with a user, a travel property search query including search criteria;

based at least in part on the search criteria, generate search results for the search query, wherein generating the search results comprises including the travel property within search results based at least on part on a past frequency of the amenity, as determined based at least partly on the indicated use of the amenity within the set of information for the travel property; and transmit the search results to the user computing device.

14. The non-transitory computer-readable media of claim 13, wherein the search results indicate a subset of amenities of the travel property, the subset selected from a set of amenities of the travel property, and wherein the computer-executable instructions further cause the computing system to include the amenity within the subset of amenities based at least partly on the indicated use of the amenity within the set of information for the travel property.

15. The non-transitory computer-readable media of claim 13, wherein the one or more amenity-associated devices comprise a mobile device of the user, wherein the amenity-use data includes coordinates of the mobile device, and wherein the computer-executable instructions further cause the computing system to identify the amenity based at least partly on a comparison of the coordinates with the coordinates of the amenity.

16. The non-transitory computer-readable media of claim 13, wherein the amenity-use data is received from the one or more amenity-associated devices.

17. The non-transitory computer-readable media of claim 13, wherein the amenity-use data is received from an intermediary device, the intermediary device comprising at least one of a home automation hub of the travel property or a network-based controller located remote from the travel property.

18. The non-transitory computer-readable media of claim 13, wherein the search results identify a plurality of travel properties responsive to the search query, including the travel property, and wherein the plurality of travel properties are ranked within the search results based at least partly on past frequencies of use for the amenity within respective travel properties of the plurality of travel properties.

19. The non-transitory computer-readable media of claim 18, wherein the plurality of travel properties are further ranked within the search results based at least partly on a duration of use for the amenity within respective travel properties of the plurality of travel properties.

20. The non-transitory computer-readable media of claim 13, wherein the computer-executable instructions further cause the computing system to:

determine a preference of the user for the amenity;

include the preference within the search criteria; and identify the travel property for inclusion within the search results based partly on the search criteria including the preference for the amenity.

21. The non-transitory computer-readable media of claim 20, wherein determining the preference of the user for the amenity comprises identifying, within historical information for the user, a history of use of the amenity within other travel properties.

\* \* \* \* \*